(No Model.)

F. M. SHARP.
HORSE TAIL CONTROLLER.

No. 587,763. Patented Aug. 10, 1897.

Witnesses
E. G. McKee
L. M. Graves

Inventor,
Francis M. Sharp.
by John Wedderburn
Attorney

UNITED STATES PATENT OFFICE.

FRANCIS M. SHARP, OF FULTON, KENTUCKY.

HORSE-TAIL CONTROLLER.

SPECIFICATION forming part of Letters Patent No. 587,763, dated August 10, 1897.

Application filed July 10, 1896. Serial No. 598,737. (No model.)

*To all whom it may concern:*

Be it known that I, FRANCIS M. SHARP, a citizen of the United States, residing at Fulton, in the county of Fulton and State of Kentucky, have invented certain new and useful Improvements in Horse-Tail Controllers; and I do hereby declare the following to be a full, clear, and exact description of the invention, such as will enable others skilled in the art to which it appertains to make and use the same.

My invention relates to horse-tail controllers.

My object is to provide an improved and simple horse-tail controller which will add to the appearance of the harness, prevent the animal from kicking when in harness, preserve the horse's tail from being worn out by being struck against the singletree, and one which will serve to straighten crooked tails, as well as being adapted to serve as a substitute for the ordinary crupper; but the principal object of my invention is to provide a horse-tail controller of such improved and novel construction that it will be impossible for the horse to switch his tail over the lines, to the annoyance of the driver, which frequently happens during fly-time.

Having these objects in view, my invention consists of a novel, simple, and highly-satisfactory wrapper adapted to encircle the horse's tail easily yet firmly.

It further consists of an improved and novel connection between said wrapper and the harness, so that while it will be impossible for the horse to switch his tail upwardly to the annoyance of the driver, yet the tail will be free, so that it may be switched laterally, thereby insuring the comfort of the horse.

Figure 1:
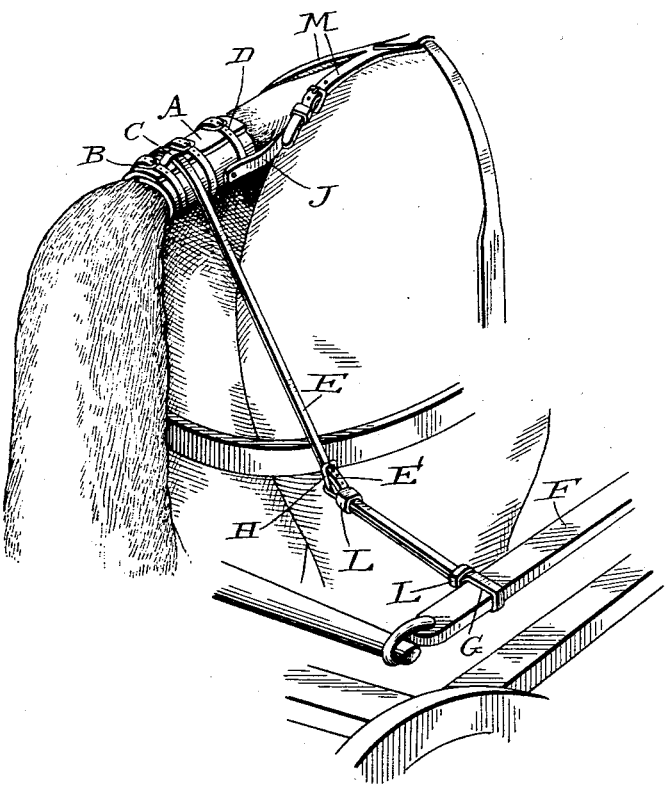
Figure 2:
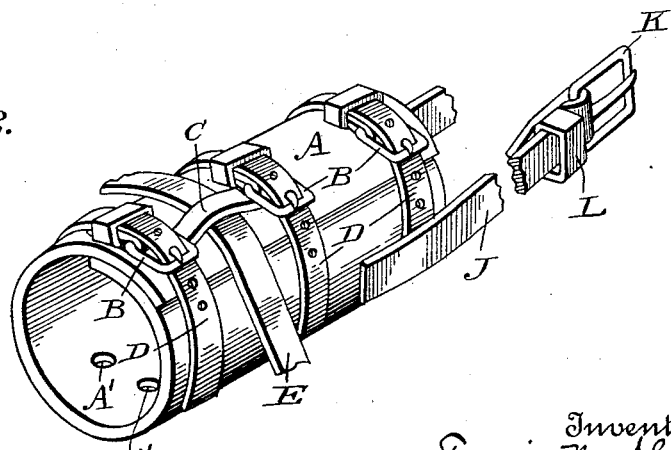

In the accompanying drawings, Figure 1 is an elevational view showing my improved horse-tail controller in use, and Fig. 2 is an enlarged perspective view of the controller.

A designates my improved wrapper, which is constructed of a single piece of leather of any preferred size and which may be as ornamental as desirable. On one of the flaps of this wrapper there is located a series of buckles B of ordinary construction. The lower end of this flap is also provided with a suitable leather loop C. Connected to the other flap of the wrapper, which lies below the flap just mentioned, is a series of straps D, which are adapted for engagement with the buckles on the said flap and by means of which the wrapper may be adjusted to grasp or encircle the horse's tail in such manner that while it will be firm enough thereon to prevent any slipping yet it will not be so tight that it will injure or trouble the horse in any manner. This wrapper can be adjusted along the length of the horse's tail, so that it will remain at any desired point, but of course it is obvious that it should encircle the bony part of the tail. When in position on the tail, it will be observed that the straps and buckles are on the upper side of the wrapper. The wrapper is provided with perforations A' for ventilation.

A single long strap E passes through the loop D, which is located at the lower end of the wrapper and over said wrapper. This strap is provided with a series of holes E' and is extended and looped around each trace F, as at G. Each end of the strap is provided with a buckle H, adapted for engagement with holes E'. Suitable confining-loops I are employed to keep the doubled sections of the strap together. This strap can be adjusted to draw the horse's tail down as far as desirable and prevent upward switching of the tail; but owing to the fact that the strap passes freely through the loop on the wrapper the horse can switch his tail laterally to drive away insects or flies whenever he desires.

Connected to each side of the wrapper is a strap J, which has a buckle K and a loop L. Said buckles and loops are adapted to receive the crupper-straps M. The straps J serve to keep the horse's tail elevated, but are loose enough to allow lateral switching.

It is obvious that slight and immaterial modifications of construction may be resorted to both in the wrapper and the adjusting-strap and the manner of connecting the same to the harness, and it is to be understood, therefore, that I do not limit myself to the precise construction herein shown and described, but consider myself entitled to all such variations as come within the spirit and scope of the invention.

Having thus described the invention, what I claim as new is—

In a horse-tail controller, the combination with the crupper-straps, of a wrapper consisting of a single broad piece of material having overlapping ends and adapted when said ends overlap to form a tube to receive the tail of a horse, fastening devices to secure the overlapping ends of the wrapper together, straps on the sides of said wrapper connected with said crupper-straps, a loop upon said wrapper, and a strap passing freely through said loop and having its ends connected with the harness.

In testimony whereof I have signed this specification in the presence of two subscribing witnesses.

FRANCIS M. SHARP.

Witnesses:
J. W. CHAMBERS,
A. J. BURROW.